UNITED STATES PATENT OFFICE.

DAVID F. SHOPE, OF ST. PAUL, MINNESOTA.

METHOD OF WATERPROOFING CEMENT BLOCKS.

985,709.  Specification of Letters Patent.  Patented Feb. 28, 1911.

No Drawing.  Application filed October 9, 1909. Serial No. 521,796.

*To all whom it may concern:*

Be it known that I, DAVID F. SHOPE, a citizen of the United States, residing at St. Paul, in the county of Ramsey and State of Minnesota, have invented certain new and useful Improvements in Methods of Waterproofing Cement Blocks, of which the following is a specification.

My invention relates to the method of forming cement blocks having a water-proof facing, its object being to water-proof the exposed face of the block without the application of external pressure or the use of special water-proofing compounds, and in such manner that the block can be immediately removed from the mold.

Cement blocks, as distinguished from cast stone, are usually formed by pressing or tamping in a mold a mixture of sand and cement in a damp or semi-dry state so that the blocks can be immediately removed from the mold. The block, when formed and cured, is a porous body with interstices, voids, or pores between the particles of sand and cement, to which mortar will adhere in wall construction, but which must be waterproofed on its exposed face to prevent the absorption of moisture.

Where a special water-proofing compound is used, it is apt to destroy perfect crystallization during the curing period as well as to discolor the block. And where a special water-proofing compound is not used, the surface to be water-proofed must be thoroughly wet in order that the cementitious material used for water-proofing shall enter the pores of the block and become thoroughly crystallized so as to form a perfect union. In the manufacture of what is called "cast stone," the cement and aggregate (sand, marble dust and the like) is mixed to a flowing mass and cast in a mold, from which it cannot be removed until it has hardened and set, that is from three to ten or twelve hours, according to the temperature and set of the cement. It is impracticable to apply this liquid process to cement blocks by placing in the bottom of the mold a sloppy mixture of cementitious material and then forming the cement block upon it, because the block cannot be removed from the mold until the wet mixture has set, and the cementitious material will not enter the pores of the block except under pressure.

In the present method the block is first formed in the usual manner by mixing sand and cement in a slightly moist or semi-dry state, and pressing or tamping it in a mold. Water is next applied, as by sprinkling, to the face of the block in sufficient quantity to enter the pores or interstices of the block, and then a powder of cement, either neat or mixed with sand or other ingredients, is sifted upon the water, which is at the same time agitated so as thoroughly to saturate the face of the block. The water will thus enter the pores or voids of the block to the required depth, and carry with it the cement powder sifted thereon. The water serves both to carry the cement into the pores and to cause crystallization of the added cement, and no external pressure will be required to force the water and cement into the block. The face of the block is then stippled or otherwise treated as may be desired, and the block removed from the machine and cured in the usual manner.

It will be understood that the main portion of the block remains in a comparatively dry state so that it can be immediately removed from the mold, and all its faces, except those exposed to the water and crystallizing mixture, will be porous so that the mortar will adhere to them, while the outer face will be proof against the absorption of water because all of the interstices and pores have been filled with crystallized cement.

The word "block" is here used generically to include a brick, tile or other mass of any shape or size, as well as a "block" technically so called.

I claim as my invention:

1. The herein described method of forming a water-proof faced cement block, which consists in first forming the block of suitable material in a semi-dry state, applying water to the face of the block in a sufficient quantity to enter the pores or interstices thereof, and adding cement to the water, whereby the cement will enter the pores or interstices with the water.

2. The herein described method of forming a water-proof faced cement block which consists in first forming the block by mixing sand and cement in a semi-dry state and molding it, then applying water to the face of the block, then spreading cement upon the water and agitating the mixture to carry the cement into the interstices of the block to the required depth.

In testimony whereof I affix my signature in presence of two witnesses.

DAVID F. SHOPE.

Witnesses:
 EDWIN R. HOLCOMBE,
 H. SMITH.